Feb. 17, 1942. E. V. UPTON 2,273,767
STEAM GENERATOR
Filed Oct. 10, 1940 2 Sheets-Sheet 1

Inventor
E. V. Upton
By
Attorney

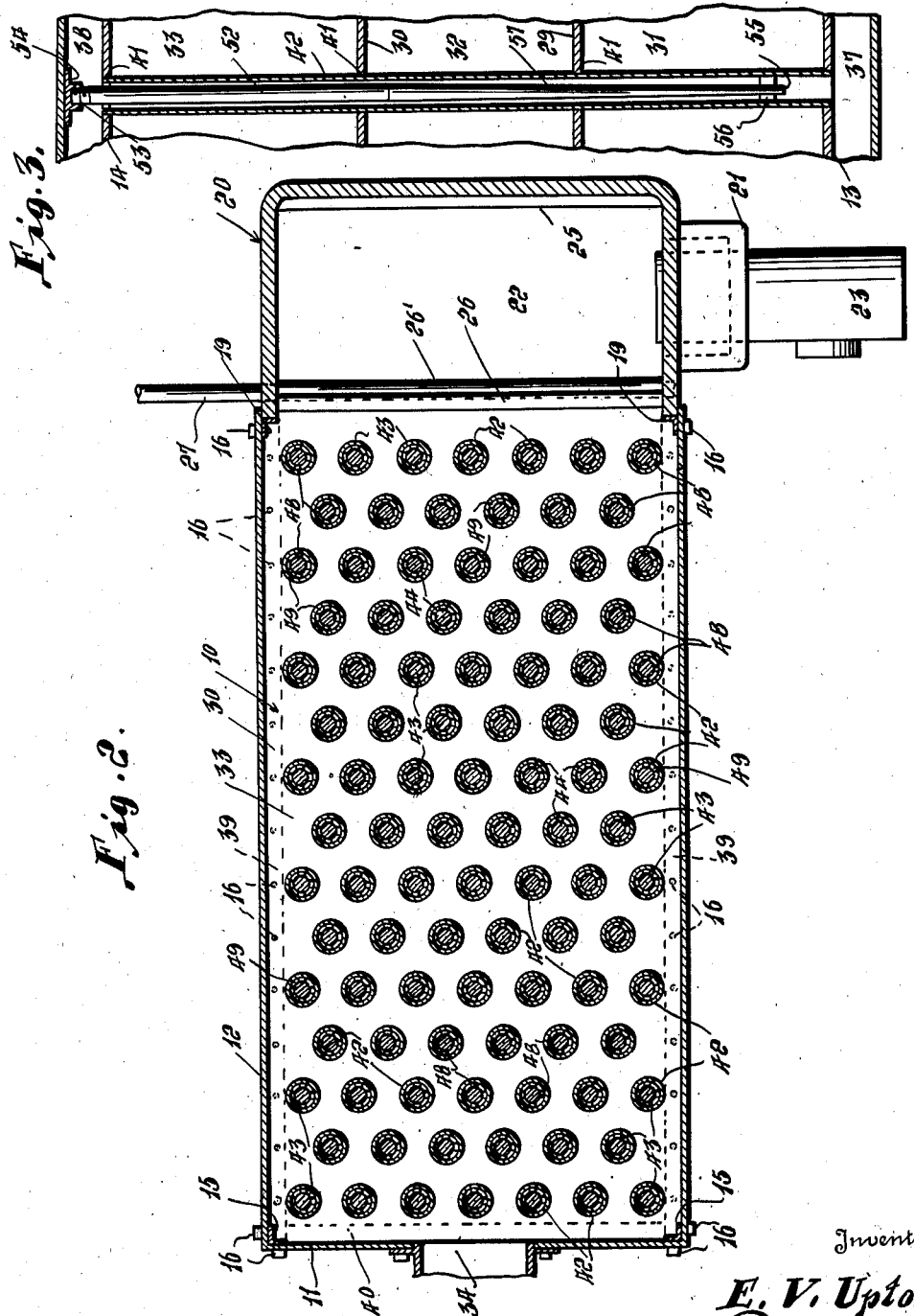

Patented Feb. 17, 1942

2,273,767

UNITED STATES PATENT OFFICE 2,273,767

STEAM GENERATOR

Eugene V. Upton, Springfield, Mo.

Application October 10, 1940, Serial No. 360,643

9 Claims. (Cl. 122—333)

This invention relates to an improved steam generator and particularly to a generator provided with means whereby a portion of the steam to be generated may be produced very rapidly and whereby larger quantities of steam may be produced more slowly and maintained for future use.

More particularly, it is an aim of the invention to provide a steam generator including tubes adapted to be subjected to heat from the exterior thereof for vaporizing a liquid contained therewithin, said tubes having spaced annular chambers of different thicknesses, and means for subjecting corresponding portions of the tubes to heat for heating the liquid contained in said chambers.

Still a further aim of the invention is to provide valve means for directing heated gases directly to the portions of the tubes provided with the thinnest chambers for vaporizing very rapidly the liquid contained in said chambers for producing steam in a short period of time.

Other objects and advantages of the invention will hereinafter become more fully apparent from the following description of the drawings, which illustrate a preferred embodiment thereof, and wherein:

Figure 2 is a horizontal sectional view taken substantially along the plane of the line 2—2 of Figure 1, and Figure 3 is a fragmentary vertical sectional view illustrating a modification of the invention.

Figure 1:
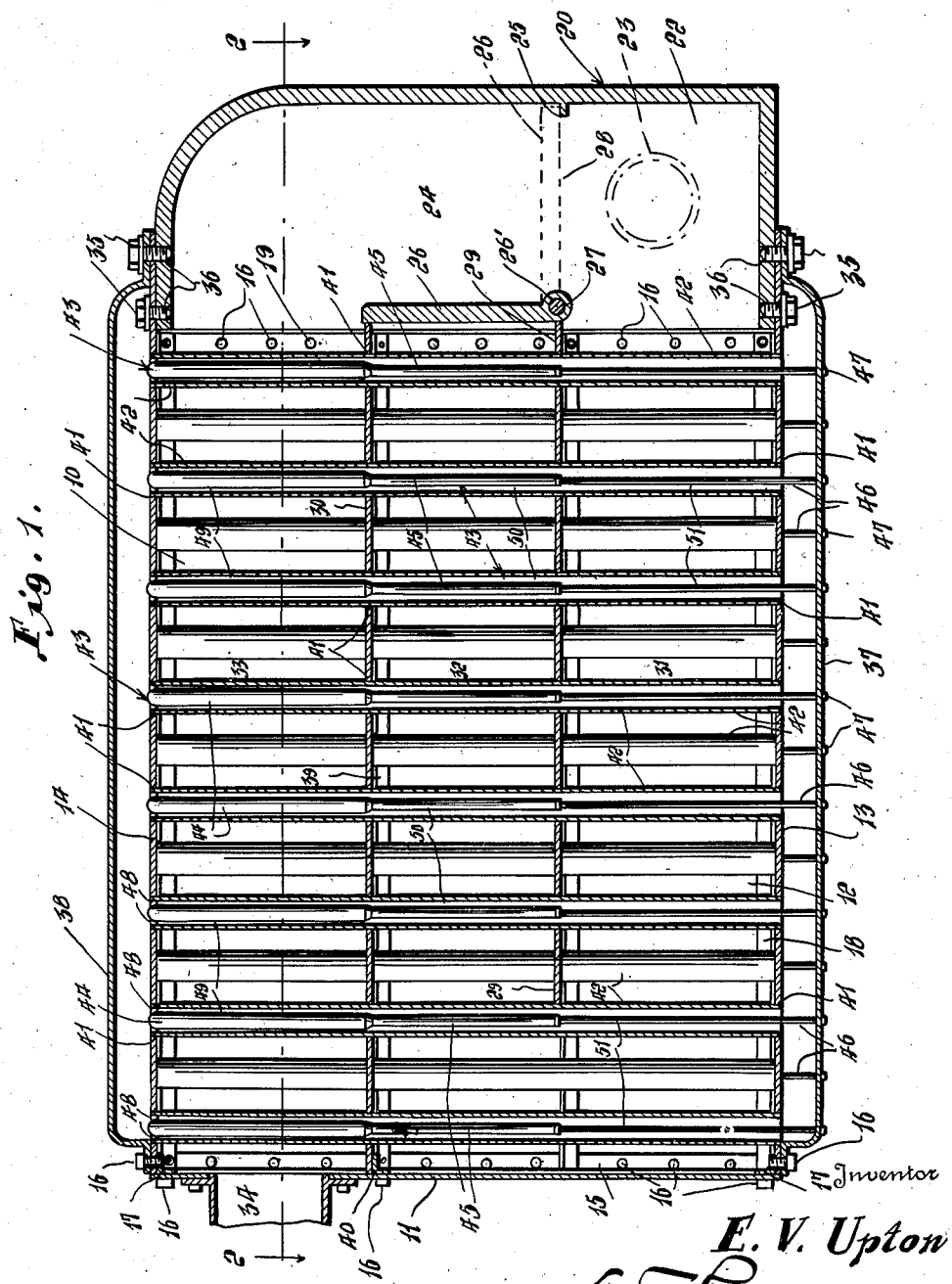
Figure 1 is a longitudinal vertical sectional view of the steam generator.

Referring more particularly to the drawings, wherein like reference characters designate like or corresponding parts throughout the different views, 10 designates generally an elongated tube section including an end wall 11, side walls 12, a bottom wall 13 and a top wall 14. The tube section 10 is provided with upright angle members 15 disposed at the corners formed by the end wall 11 and the side walls 12, as best seen in Figure 2, and which are attached to the walls 11 and 12 by fastenings 16. The tube section 10 is also provided with horizontally disposed angle members 17 which extend along the end wall 11, adjacent the top and bottom thereof, and which are attached thereto by similar fastenings 16. One end of the bottom wall 13 and the top wall 14 is each attached by similar fastenings 16 to one of the sides of each of the angle members 17, as best seen in Figure 1. Longitudinally disposed horizontal angle members 18 extend along and are fastened to the side walls 12, adjacent the top and bottom edges thereof and to the top and bottom walls 13 and 14, respectively, adjacent their longitudinal edges, by additional fastenings 16. A pair of upright angle members 19 are fastened, each along one side thereof, by means of a plurality of fastenings 16 to the side walls 12, adjacent their opposite ends.

The angle members 15, 17, 18 and 19 are all disposed within the tube section 10. The angle members 17 are suitably connected at their ends to the upright angle members 15, and the angle members 18 are each suitably connected at one end to an angle member 15 and at their opposite ends to angle members 19.

A fire box 20 forms the opposite end wall of the tube section 10 and is provided with a portion 21 in the lower portion 22 thereof in which is mounted a burner 23, of conventional construction which opens into portion 22. The fire box 20 also includes an upper section 24 between which and the lower section 22 is provided a flange 25 which extends inwardly from the end wall thereof. A diversion damper 26 is fixedly mounted on a shaft 27 at the opposite side of the fire box 20 to the flange 25 for closing the passage 28 between the chambers 22 and 24 when the diversion damper 26 is in its closed, dotted line position of Figure 1. The diversion damper includes a barrel portion 26' which engages around shaft 27, said shaft being journaled in the side walls of fire box 20, the controls for the damper (not shown) being operatively connected to said shaft.

The tube section 10 is provided with horizontal partitions 29 and 30 which are disposed in spaced apart relationship to one another and to the bottom and top walls 13 and 14 to divide the tube section 10 into a lower compartment 31, an intermediate compartment 32, and an upper compartment 33. As best seen in Figure 1, the partitions 29 and 30 extend slightly into the fire box 20. One end of the lower partition 29 contacts the barrel 26', and the free end of the diversion damper 26, when in a raised open position, contacts the corresponding end of the partition 30. The upper partition 30 extends from end to end of the tube section 10 while the lower partition 29 extends from the barrel 26' to adjacent the end wall 11, for a purpose which will hereinafter become apparent. End wall 11 is provided with a flue 34 which communicates with the upper compartment 33.

Referring to Figure 1, the bottom and top walls 13 and 14, respectively, overlap portions of the bottom and top of the fire box 20 and are attached thereto by bolts 35 which engage drilled openings 36 in the fire box 20.

A pan shaped member 37, which is provided with a flanged rim, is disposed beneath the bottom wall 13 and detachably connected to the tube section 10 by means of the fastenings 16, which connect the bottom wall 13 to the angle members 17 and 18. The end of the pan 37, which is disposed adjacent the fire box 20, is attached thereto by one or more bolts 35 which extend through alined openings in the flange of the pan shaped member 37 and in an end of the wall 13 and which engage additional drilled openings 36 in the bottom of the fire box 20. A similarly shaped pan shaped member 38 is detachably mounted, in an inverted position, in the same manner on top of the tube section 10. As best seen in Figure 2, the side walls of the fire box 20 are held in abutting engagement with the transverse sides of the upright angle members 19 by the fastenings 35 which attach the fire box to the tube section 10, so that it forms one end thereof. The side walls 12 overlap the free edges of the sides of the fire box 20 to seal the joint formed by the abutting portions of said sides and of the angle members 19.

The member 37 forms a water pan at the bottom of the tube section 10 and the member 38 forms a steam chest at the top thereof. The partitions 29 and 30 are supported in the tube section 10 by means of the longitudinally disposed angle members 39, each of which is attached along one side by fastenings 16 to the inner side of a side wall 12. The upper, horizontally disposed sides of the angle members 39 project inwardly of one another to provide rests for the partitions 29 and 30. The partition 30 is also supported at one end by an angle member 40, which is attached by fastenings 16 to the inner side of the wall 11. The angle members 39 are suitably attached at their ends to the uprights 15 and 19, and the angle member 40 is suitably attached at its ends to the uprights 15.

Bottom and top walls 13 and 14 and partitions 29 and 30 are provided with alined openings 41 to receive tubes 42, each of which extends through the partitions 29 and 30 and into the top and bottom walls 14 and 13, to form communicating passages through the tube section 10, and between the water pan 37 and the steam chest 38.

A spindle 43 is mounted in each of the tubes 42. Spindles 43 each include an upper portion 44, an intermediate portion 45, and a lower portion 46. The upper portion 44 is substantially greater in diameter than the intermediate portion 45, which in turn, is greater in diameter than the lower portion 46. Upper portion 44 extends substantially from the top to the bottom of compartment 33, the intermediate portion 45 extends substantially from the top to the bottom of compartment 32, and lower portion 46 extends substantially from the top of compartment 31 to the bottom of the water pan 37, in which the lower ends of the spindles 43 are secured by means of small bolts 47, which extend through the bottom of water pan 37 and into threaded recesses, not shown, in the lower ends of spindles 43. The spindles 43 at their upper ends are provided with outwardly projecting tits 48, as best seen in Figure 1, for engaging the interior of the tubes 42 for retaining the upper portions 44 of the spindles 43, in spaced apart relationship to the inner walls of the tubes 42. Portions 44 combine with the tubes 42 to form the relatively thin annular chambers 49, the portions 45 combine with the inner walls of the tubes 19 to form the annular chambers 50, which are thicker than the chambers 49, and the portions 46 similarly combine with the inner walls of the tubes 42 to form the annular chambers 51 which are thicker than the chambers 50.

In Figure 3, a modified form of spindle is disclosed, designated generally 52 which is provided with an enlarged upper end which is threaded at 53 to engage an internally threaded socket 54 which is suitably attached to the under side of the top portion of the steam chest 38. The spindle 52 tapers from its enlarged, upper threaded end 53 to its opposite end 55. Spindle 52 extends downwardly through a tube 42 and terminates adjacent the lower end thereof Adjacent its end 55, the spindle 52 is provided with outwardly projecting fins 56 for holding the lower portion of the spindle 52 concentric with the tube 42 within which it is disposed. It is to be understood that all of the tubes 42 can be equipped with a spindle 52 instead of the spindles 43, if desired. Spindle 52 forms with the tube 42 an annular chamber 57 which diminishes gradually in thickness from the lower to adjacent the upper end of the spindle.

It is to be understood that in the steam generator or vertical water tube boiler, just previously described, many accessories common to steam boilers, such as a water pump, water inlets, steam outlets, water level regulator, safety valves and the like have not been illustrated or described as they form no part of the present invention, and it is therefore to be understood that such accessories of conventional construction are intended to be provided and employed to function in their conventional capacities.

Assuming that the water pan 37 is filled with water which may be pumped into pan 37 in sufficient quantity to fill the tubes 42, heated gases are discharged into compartment 22 of the fire box 20 and if it is desired to furnish steam very quickly, the diversion damper 26 is moved to an open position, as illustrated in full lines in Figure 1, to shut-off the passage from compartment 32 to chamber 24 and to open the passage 28 so that there will be no circulation through compartments 31 and 32. The heated gases will therefore pass upwardly through passage 28 from compartment 22 into compartment 24 and into compartment 33, and then through compartment 33 for heating the upper portions of the tubes 42. The relatively thin annular chambers 49, which are contiguous with compartment 33, will each contain a very thin film of water all of which will be disposed adjacent to the walls of the tubes 42 to be quickly heated and vaporized. The steam thus produced will be discharged into the steam chest 38 and the products of combustion after passing through compartment 33 will be discharged through the flue 34. After sufficient steam has been produced to satisfy immediate requirements, diversion damper 26 may be swung to its dotted line position, of Figure 1, to cause the heated gases to flow from section 22 into and through compartment 31 to adjacent the end wall 37 then upwardly past the end of the partition 29 and into compartment 32, back through compartment 32 and into compartment 24, then upwardly into and through compartment 33 The water in the thicker annular chambers 50 and 51 will be heated more slowly, due to the fact that a greater percentage of the water is not in contact with the tubes 42, to provide a storage supply of heated water which, as it moves upwardly into the annular chambers 49 will be heated more rapidly and to a greater degree to vaporize it and provide further steam for the steam chest 38. It will thus be seen that large quantities of water may be heated, maintained hot, vaporized and retained in the form of steam or a portion of the steam to be generated may be produced very rapidly to meet an immediate demand for steam.

It will be obvious that the same results may be accomplished when the steam generator is equipped with the spindles 52 instead of the spindles 43.

The steam generator may obviously be used for many purposes but is especially adapted and intended for use in driving a steam engine for propelling motor vehicles. A thermostat, not shown, may be provided for operating the diversion damper 26 to move it from its full line to its dotted line position, of Figure 1, and/or the diversion damper 26 may be operated manually to direct the heated gases by the direct route, first described through compartment 33 for producing steam very rapidly or by the indirect route, last described, which is employed under ordinary operating conditions and after a sufficient head of steam is available.

Various modifications and changes are contemplated and may obviously be resorted to as only a preferred embodiment of the invention has been disclosed.

I claim as my invention:

1. A steam generator comprising a water pan, a steam chest disposed above the water pan, a plurality of tubes connecting the water pan and steam chest, means for conveying heated gases around said tubes for heating water contained therein, and means disposed within the tubes for varying the amount of water contained in different sections of the tubes and for retaining the water adjacent the walls of the tubes, said last mentioned means comprising spindles disposed in said tubes and including portions of different diameters for forming annular chambers of varying thicknesses, decreasing progressively toward the steam chest.

2. A steam generator comprising a water pan, a steam chest disposed above the water pan, a plurality of tubes connecting the water pan and steam chest, means for conveying heated gases around said tubes for heating water contained therein, and means disposed within the tubes for varying the amount of water contained in different sections of the tubes and for retaining the water adjacent the walls of the tubes, said last mentioned means comprising spindles disposed in said tubes and including portions of different diameters for forming annular chambers of varying thicknesses, and the thickness of said annular chambers increasing from the upper ends to the lower ends of the tubes.

3. In a steam generator, a tubular member adapted to contain a liquid and adapted to be heated by the passage of heated gases therearound for converting the liquid into steam, and means disposed in said tube and extending substantially from end to end thereof for forming annular chambers within the tube of different thicknesses, the thickness of said chambers increasing progressively from one end to the other end of the tube, and the thinnest chamber being disposed adjacent the upper, outlet end of the tube.

4. A steam generator comprising a casing having a water pan at the bottom thereof and a steam chest at the top thereof, a plurality of perpendicular tubes disposed in spaced apart relationship relatively to one another and connecting said water pan and steam chest, a fire box at one end of said casing, said casing being provided with horizontal baffles for directing heated gases back and forth through the casing from the bottom to the top thereof for heating corresponding portions of said tubes, an outlet for said gases in an end of said casing and adjacent to the upper portions of said tubes, and a valve associated with the fire box for directing the heated gases directly to the upper part of the casing for heating the upper portions of the tubes, when the valve is in an open position.

5. A steam generator as in claim 4, comprising means disposed in said tubes for forming a plurality of annular chambers in each of the tubes, said annular chambers being of different thicknesses, and the thicknesses of said chambers increasing progressively from the upper portions to the lower portions of the tubes whereby liquid contained in the upper portions of the tubes will be heated more rapidly than liquid in the lower portions thereof.

6. A steam generator comprising a casing having a steam chest at the top thereof and a water pan at the bottom thereof, tubes connecting said steam chest and water pan, means disposed in said tubes for forming annular chambers of different thicknesses in each of the tubes, the thicknesses of said annular chambers increasing progressively from the upper to the lower ends of the tubes, said casing being provided with spaced horizontal baffles for directing heated gases, entering the casing adjacent the bottom thereof, back and forth through the casing from the bottom to the top thereof for heating corresponding portions of the tubes, and a valve for directing the gases into the lower portion of the casing, when disposed in one position, and for directing the heated gases directly to the upper portion of the casing, when disposed in another position.

7. A steam generator as in claim 6, said casing being provided with an outlet for gases in an end of said casing and adjacent to the upper portions of the tubes.

8. A device as in claim 6, said means comprising spindles disposed in said tubes and spaced from the walls thereof, said spindles having stepped portions of different diameters increasing progressively from their lower to their upper ends.

9. A steam generator comprising a water pan, a steam chest disposed above the water pan, a plurality of tubes connecting the water pan and steam chest, means for conveying heated gases back and forth around said tubes for heating water contained therein, and tapered spindles disposed in the tubes for forming annular chambers therein, said spindles being tapered from their upper to their lower ends, and the enlarged ends of the spindles being adjacent the steam chest and outlet ends of the tubes.

EUGENE V. UPTON.